March 16, 1926.

R. J. LABEYRIE ET AL

MACHINE FOR MOLDING BREAD LOAVES

Filed Jan. 18, 1923

1,577,130

INVENTORS
Raymond J. Labeyrie and
Frank A. Iavagnilio
BY H. G. Manning
ATTORNEY

Patented Mar. 16, 1926.

1,577,130

UNITED STATES PATENT OFFICE.

RAYMOND J. LABEYRIE AND FRANK A. IAVAGNILIO, OF TORRINGTON, CONNECTICUT.

MACHINE FOR MOLDING BREAD LOAVES.

Application filed January 18, 1923. Serial No. 613,517.

*To all whom it may concern:*

Be it known that we, RAYMOND J. LABEYRIE, a citizen of the United States, and a resident of Torrington, county of Litchfield, and State of Connecticut, and FRANK A. IAVAGNILIO, a citizen of the United States, and a resident of Torrington, county of Litchfield, and State of Connecticut, have invented certain new and useful Improvements in Machines for Molding Bread Loaves, of which the following is a specification.

This invention relates to bread molding machinery, and more particularly to a machine for producing tapered loaves of the so-called "Vienna" type.

One object of this invention is to provide a device of the above nature which will be simple, cheap to manufacture, and very efficient and durable in use.

With this and other objects in view, there has been illustrated on the accompanying drawing one form in which the invention may be conveniently embodied in practice.

Figure 1:
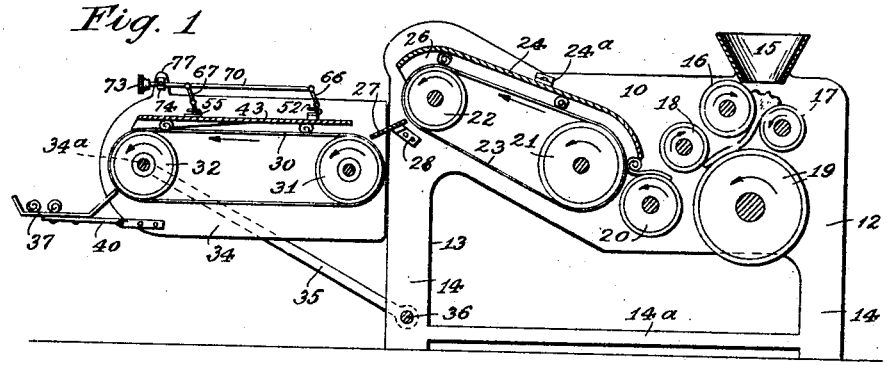
Fig. 1 represents a side view of the complete machine, with certain parts shown in section for greater clearness.

In the manufacture of bread loaves in the past, it has been found impossible to produce, mechanically, loaves of the so-called "Vienna" style having tapered ends. Consequently the price of such loaves is unnecessarily high owing to the excessive labor cost.

According to the present invention, the above and other disadvantages have been avoided. This has been accomplished by providing a machine which will first sheet the lumps of bread dough, which will then coil the dough sheets into cylindrical coils, and which will finally taper the ends of said coils.

Referring now to the drawings in which like reference numerals denote corresponding parts throughout the several views, the sheeting and coiling part of the device comprises a front casing consisting of a base 10, a pair of side frames 11 and 12, said side frames being cut away at 13 and having legs 14 connected by brace members 14ª. A conical hopper 15 is provided at the top of the casing, and is adapted to receive weighed lumps of bread dough, which may be fed in rapid succession. Directly below the hopper 15 are a pair of upper rolls 16 and 17, said rolls being adapted to receive the lumps of dough fed through the hopper, and sheet them to any desired extent.

After the lumps of dough have been sheeted by the rolls 16 and 17, they pass downwardly between the lower sheeting rolls 18 and 19. The sheets of dough are then delivered to a transfer roll 20 and fed to the coiling mechanism. The coiling mechanism comprises a pair of pulleys 21 and 22 rotating in the same direction, both pulleys being journaled between the side frames 12 and 13. The pulley 22 is located at a somewhat higher elevation than the pulley 21 in order to raise the cylindrical lumps of dough above the tapering attachment, to be hereinafter more fully described. An endless belt 23, of fabric or any other suitable material, is mounted to travel around the pulleys 21 and 22. A guide plate 24 is supported between the side plates 11 and 12 in any suitable manner, as by brackets 24ª. The guide plate 24 has a central flat portion and a pair of curved end portions arranged equidistant from the corresponding portion of the belt 23, and in order to prevent the bread loaves from dropping over the edges of the belt 23, the guide plate is provided with a pair of downwardly depending side flanges 25 and 26.

The sheets of bread dough are automatically fed from the transfer roll 20 to the opening between the belt 23 and the guide plate 24, said transfer roll being so located with respect to said opening that the dough sheets will be rolled up into the form of cylindrical coils, said coils being thereafter thoroughly kneaded, as they continuously roll over and over between the belt 23 and plate 24 when being carried along by the conveyor belt 23, in the direction indicated by the arrow, Fig. 1. Below the end of the pulley 22 and guide plate 24, a deflecting plate 27 is provided, said deflecting plate being secured in rigid position between the side plates 11 and 12 by means of angle brackets 28 and 29. The deflecting plate 27 is adapted to receive the loaves as they drop from the end of the conveyor belt 23, and direct them upon a conveyor belt 30. The conveyor belt 30 is driven in the direction indicated by a pair of pulleys 31 and 32, as clearly shown in Fig. 1. The pulleys 31 and 32 are journaled within a pair of side plates 33 and 34 forming a rear extension casing. The side plates 33 and 34 are supported upon the front casing in any suitable manner, as by means of a pair of brace bars 35. Each brace bar 35 is journaled at one end upon a shaft 34ª outside the pulley 32 and on its other end upon a cross rod 36 mounted in the side plates 11 and 12 of the front casing.

In order to collect the completely shaped loaves as they drop from the end of the conveyor belt 30, a receptacle 37 is provided at the end of the apparatus, said receptacle being located slightly below the pulley 32. The receptacle 37 has its front and rear edges inclined outwardly, and is secured at its bottom to the side plates 33 and 34 of the rear casing, by means of a pair of attaching strips 40. The rear casing is further secured to the front casing by means of a pair of pivoted hook members 41 adapted to engage over pins 42 on said front casing.

The pulleys 16, 17, 18, 19, 20, 21, 22, 31, and 32 are adapted to be rotated in the directions indicated in Fig. 1 by any suitable driving means, not shown.

The device for converting the cylindrical lumps delivered to the belt 30 from the belt 23, comprises a shaper plate 43 adapted to be located above said belt 30. The shaper plate 43 has a flat top face 44 and a pair of converging side edges 45, 46, its front edge 47 being spaced a short distance from the deflector 27. The converging side edges 45, 46, and the front edge 47 of the shaper plate 43 are preferably beveled on their under sides in order to eliminate sharp edges which might catch in the dough. The bottom surface of the shaper plate 43, between the converging side edges 45 and 46, is entirely flat. Between its parallel rear side edges 48 and 49, however, the shaper plate 43 is provided with a pair of downwardly inclined wedge-shaped sections 50 and 51. When producing a loaf of the smallest size of which the machine is capable, the rear edges 51ª of said wedge-shaped sections 50 and 51 are adapted to rest upon or slightly above the conveyor belt 30. Between the wedge-shaped sections 50 and 51, the rear bottom surface of the shaper plate 43 is concave, said concave section having substantially the shape of an ellipse.

Figure 2:
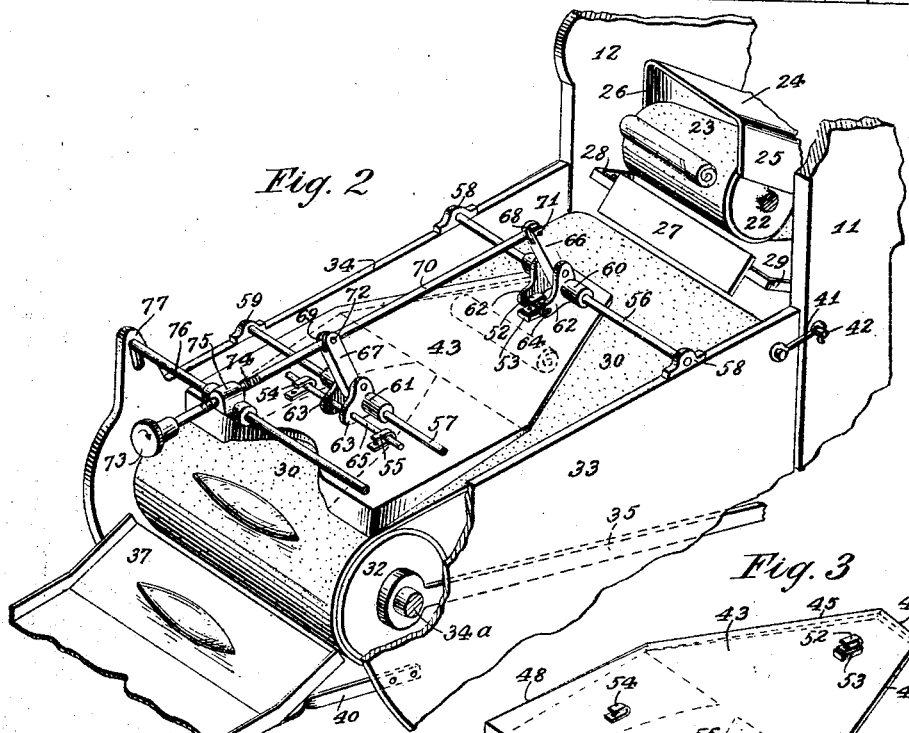
Fig. 2 is a perspective view, on an enlarged scale, of one end of the bread molding machine, showing the shaper plate for tapering the ends of the loaves.
Figure 3:
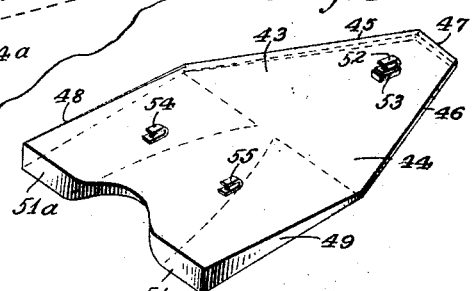
Fig. 3 is a top perspective view of the shaper plate.
Figure 4:
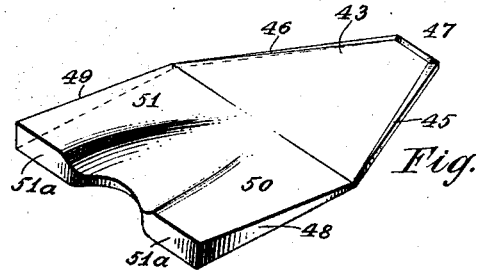
Fig. 4 is a bottom perspective view of the shaper plate.

The top of the shaper plate 43 is detachably supported in position above the conveyor belt 30 by three hooks 52, 54, 55. The front hook 52 is secured to said plate 43 by means of a supporting block 53, while the rear hooks 54 and 55 are directly secured to the plate 43, preferably by rivets as shown, In order to support the hooks 52, 54, 55 of the shaper plate 43, a pair of cross rods 56 and 57 are mounted in bearing blocks 58 and 59, said bearing blocks being secured in any desired manner to the side plates 33 and 34. Rigidly carried by the cross rods 56 and 57 adjacent the center thereof are a pair of spaced lever brackets 60 and 61, said brackets 60 and 61 having side lugs 62 and 63 respectively. The lugs 62 are provided with alined apertures to receive a relatively short pin 64, while the lugs 63 have similar alined apertures to receive a relatively long pin 65. As will be clear from Fig. 2, the short pin 64 is detachably seated within the front hook 52, while the ends of the relatively long pin 65 are adapted to extend under the rear hooks 54 and 55.

In order to permit the shaper plate 43 to be readily adjusted up and down with respect to the conveyor belt 30, a pair of lever arms 66 and 67 are provided, said arms 66 and 67 having their upper ends slotted at 68 and 69 respectively, and being secured in rigid relation between the pairs of lever brackets 62, 62, and 63, 63, respectively. An adjusting rod 70 fits within the slots 68 and 69 and is connected thereto by pins 71 and 72. The rear of the adjusting rod 70 is provided with a hand knob 73 and has an intermediate threaded section 74 screwed within a threaded block 75. The threaded block 75 is mounted upon a rod 76 which is rigidly secured at its ends to a pair of upstanding ears 77 on the side plates 33 and 34.

In operation, the bread dough will first be weighed out in masses of equal weight, and the lumps will then be dropped successively into the hopper 15. The hopper 15 will guide the lumps of dough between the rolls 16 and 17, which together with the roll 18 will flatten them out into sheets. The sheets of dough will then be delivered to the transfer roll 20 from which they will be passed to the conveyor belt 23. The conveyor belt 23 will carry them under the guide plate 24, thereby rolling said sheets into cylindrical coils and carrying said coils along until they drop off the conveyor belt 23 and are deflected by the plate 27 to the conveyor belt 30. Each cylindrical roll of dough will be drawn forward on the belt 30 under the extension shaper plate 43 whereby the loaf is rolled down into the desired tapered or "Vienna" shape. The completed loaves drop off the end of the conveyor belt 30 and are collected in the receptacle 31 from which they may be taken to the ovens for baking whenever desired.

While there has been disclosed in this specification one form in which the invention may be embodied, it is to be understood that this form is shown for the purpose of illustration only, and that the invention is not to be limited to the specific disclosure, but may be modified and embodied in various other forms without departing from its spirit. In short, the invention includes all the modifications and embodiments coming within the scope of the following claim.

Having thus fully described the invention what is claimed as new, and for which it is desired to secure Letters Patent is:

In a machine for producing bread loaves having conical ends, a frame, a conveyor belt mounted to travel in said frame and adapted to receive successive lumps of dough, a shaper plate mounted in said frame above said belt, said plate having a lower generally flat face with a rear central concave portion which increases gradually both in depth and width from the front to the rear, the surface of the plate being imperforate, and said plate having a shallow recess in the rear edge thereof, said concave portion merging into said recess, the rear portion of said plate lying between said concave portion and the sides of the plate being wedge-shaped in longitudinal cross section.

In testimony whereof, we have affixed our signatures to this specification.

RAYMOND J. LABEYRIE.
FRANK A. IAVAGNILIO.